(12) United States Patent
Kim et al.

(10) Patent No.: US 8,839,936 B2
(45) Date of Patent: Sep. 23, 2014

(54) PARKING SYSTEM FOR HYBRID VEHICLE

(75) Inventors: Kyungha Kim, Yongin-si (KR); Min Sung Kim, Seoul (KR); Jinsook Lee, Uijeongbu-si (KR); Yeonho Kim, Suwon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 455 days.

(21) Appl. No.: 13/190,393

(22) Filed: Jul. 25, 2011

(65) Prior Publication Data
US 2012/0145512 A1 Jun. 14, 2012

(30) Foreign Application Priority Data
Dec. 8, 2010 (KR) .................. 10-2010-0124900

(51) Int. Cl.
*F16H 61/22* (2006.01)
*F16H 63/34* (2006.01)

(52) U.S. Cl.
USPC ....... 192/219.5; 192/219.6; 188/31; 74/411.5

(58) Field of Classification Search
USPC .............. 192/219.4–219.6; 188/31; 74/411.5, 74/577 S
See application file for complete search history.

(56) References Cited

U.S. PATENT DOCUMENTS

| 6,164,427 | A | * | 12/2000 | Ogawa | 192/219.5 |
| 7,383,933 | B2 | * | 6/2008 | Reed et al. | 192/219.5 |
| 8,240,448 | B2 | * | 8/2012 | Hongawara et al. | 192/219.5 |
| 8,387,769 | B2 | * | 3/2013 | Kim | 192/219.5 |
| 2012/0168275 | A1 | * | 7/2012 | Morisawa et al. | 192/219.5 |

FOREIGN PATENT DOCUMENTS

| JP | 2006-160239 A | 6/2006 |
| JP | 3844110 B2 | 8/2006 |
| JP | 2008-132805 A | 6/2008 |
| JP | 2009-143348 A | 7/2009 |
| KR | 10-0717306 B1 | 5/2007 |
| KR | 10-2007-0108352 A | 11/2007 |

* cited by examiner

*Primary Examiner* — Jacob S Scott
(74) *Attorney, Agent, or Firm* — Morgan, Lewis & Bockius LLP

(57) ABSTRACT

A parking system for a hybrid vehicle includes a transmission housing, a first motor section provided in the transmission housing, and mounted on an input shaft, a second motor section provided at the rear of the first motor section, and mounted on the input shaft, and a parking mechanism provided between the first motor section and the second motor section for selectively restraining a drive gear spline-coupled to the second motor section. The parking system for a hybrid vehicle can be reduced in overall size by improving the layout of the parking mechanism within the transmission with two motors and forming the parking gear integrally with the drive gear.

4 Claims, 4 Drawing Sheets

PARKING SYSTEM FOR HYBRID VEHICLE

CROSS-REFERENCE TO RELATED APPLICATION

This application claims priority to and the benefit of Korean Patent Application No. 10-2010-0124900 filed Dec. 8, 2010, the entire contents of which application is incorporated herein for all purposes by this reference.

BACKGROUND OF INVENTION

1. Field of Invention

The present invention relates to a parking system, more particularly, to a parking system for a hybrid vehicle, which is applied to a hybrid vehicle transmission with two motors.

2. Description of Related Art

In general, a parking mechanism is mounted in a decelerator. When a driver manipulates a shift lever, a sprag is engaged with a parking gear by a cam mounted on a parking rod to thus restrain driving wheels.

However, a typical parking mechanism brings about an increase in the size of peripheral parts, such as a case or housing, due to the overall size of the parking mechanism, and adds weight and cost.

Moreover, as the typical parking mechanism is in a low position, this increases the length of a manual shaft and results in a higher torsion torque. Thus, the operability becomes low and the outer diameter of a shaft becomes larger.

In addition, a parking state between a gear and sprag teeth may be released in view of the structures of the parking rod and a detent lever fixing mechanism.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a parking system for a hybrid vehicle, which can reduce weight and production costs as the layout of a parking mechanism in a transmission with two motors is improved to reduce overall size and simplify components.

Various aspects of the present invention provide for a parking system for a hybrid vehicle, the parking system including a transmission housing, a first motor section provided in the transmission housing, and mounted on an input shaft, a second motor section provided at the rear of the first motor section, and mounted on the input shaft, and a parking mechanism provided between the first motor section and the second motor section for selectively restraining a drive gear spline-coupled to the second motor section.

The parking mechanism includes a manual lever, a detent lever coupled to the manual lever and selectively rotating with the manual lever, a parking rod coupled to the detent lever and provided to be movable with the rotation of the detent lever in the longitudinal direction of the detent lever, a parking rod cam provided on the parking rod, a parking rod spring provided on the parking rod and elastically supporting the parking rod, a parking gear formed integrally with the drive gear between the first motor section and the second motor section, a sprag hinged to the transmission housing and engaged with the parking gear with longitudinal movement of the parking rod cam, and a sprag spring elastically supporting the sprag.

The parking gear is formed integrally on one surface of the drive gear facing the first motor section.

The parking rod is guided by a brake housing formed between the first and second motor sections within the transmission housing when moved by the rotation of the detent lever.

As described above in detail, the parking system for a hybrid vehicle according to various aspects of the present invention can be reduced in overall size by improving the layout of the parking mechanism within the transmission with two motors and forming the parking gear integrally with the drive gear.

Moreover, a conventional guide bracket can be omitted because the parking rod is guided through the brake housing mounted within the transmission housing when moved, thereby simplifying the components and reducing weight and production costs.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
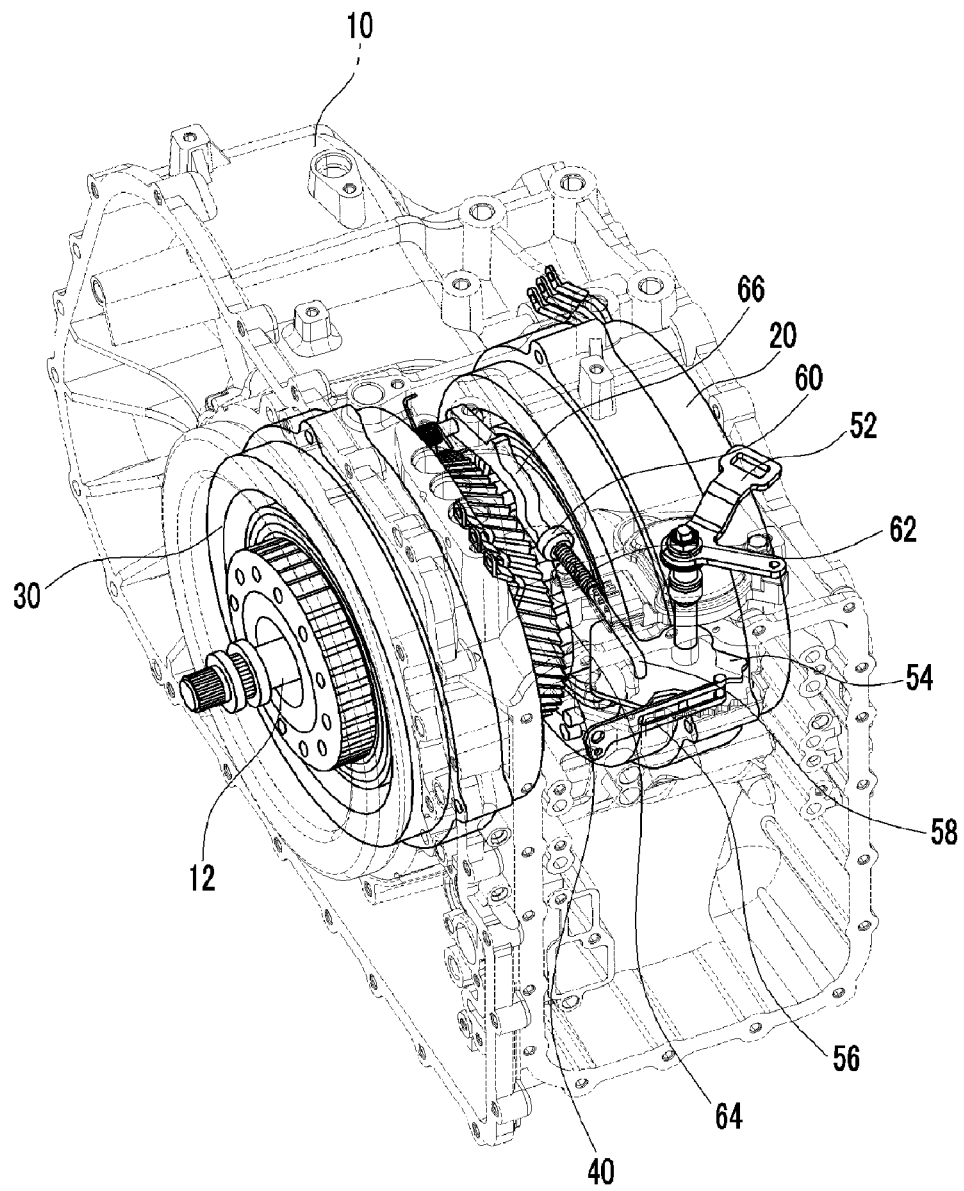
FIG. 1 is a perspective projection view of a transmission housing with an exemplary parking system for a hybrid vehicle according to the present invention.
Figure 2:
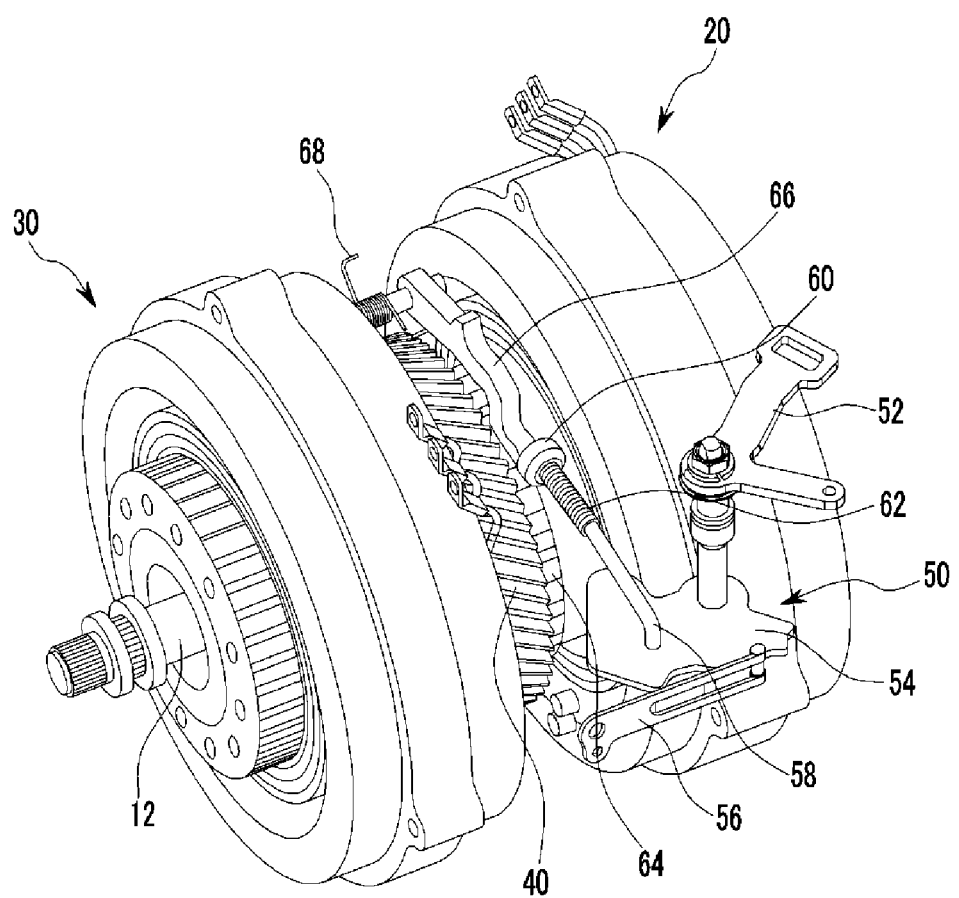
FIG. 2 is a perspective projection view of the parking system of FIG. 1.

Referring to the drawings, the parking system for a hybrid vehicle according to various embodiments of the present invention comprises, as shown in FIGS. 1 and 2, a transmission housing 10, first and second motor sections 20 and 30 provided within the transmission housing 10, and a parking mechanism 50.

The first and second motor sections 20 and 30 may be motors for driving a vehicle, or generators.

First of all, the first motor section 20 is provided in the transmission housing 10, and mounted on an input shaft 12.

The first motor section 20 is connected to the input shaft 12 through a rotor of the first motor section 20.

The second motor section 30 is provided at the rear of the first motor section 20, and mounted on the input shaft 12.

The second motor section 30 is connected to the input shaft 12 through a rotor of the second motor section 30 in the same manner as the first motor section 20.

The parking mechanism 50 is provided between the first motor section 20 and the second motor section 30 and selectively restrains a drive gear 40 to be spline-coupled to the second motor section 30.

Here, the drive gear 40 is spline-coupled through the rotor of the second motor section 30 and rotates together with the input shaft 12.

The parking mechanism 50 of this type is configured between the first and second motor sections 20 and 30 within the transmission housing 10, being disposed perpendicular to the input shaft 12.

Figure 3:
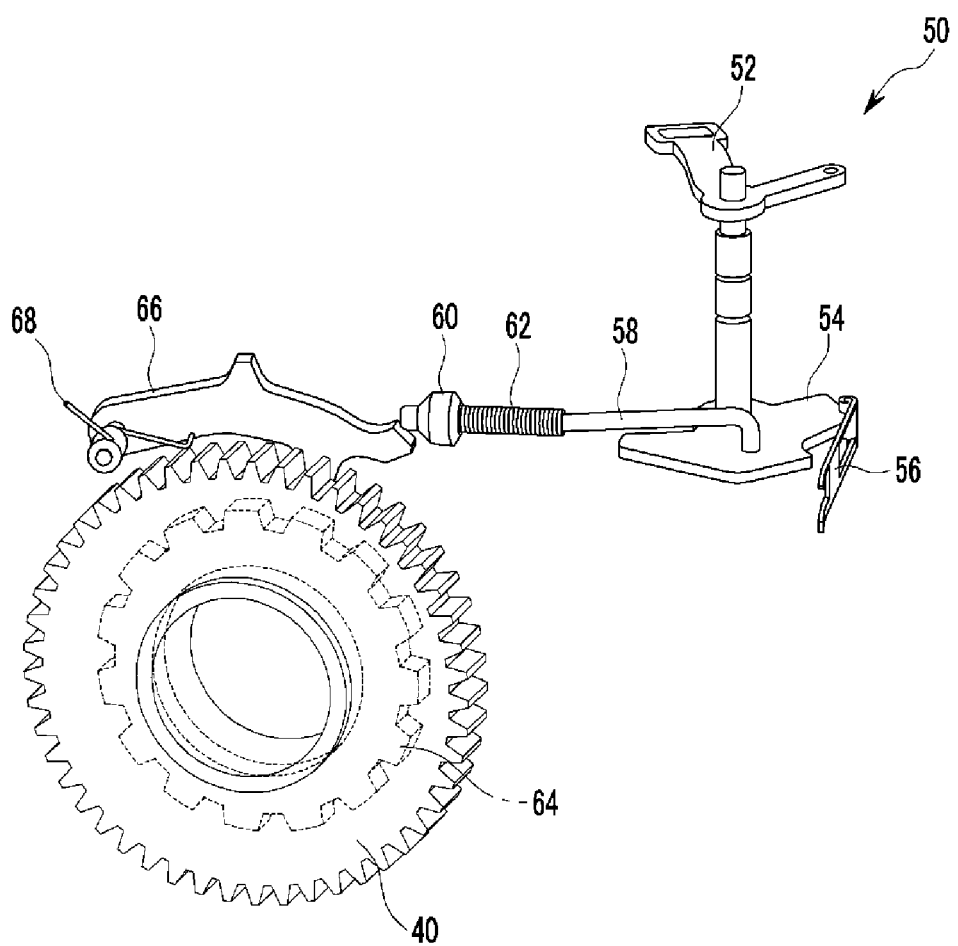
FIG. 3 is a perspective view of an exemplary parking mechanism applied to the parking system of FIG. 1.

In various embodiments, the parking mechanism 50 comprises, as shown in FIG. 3, a manual lever 52, a detent lever 54 coupled to the manual lever 52 for selectively rotating with the manual lever 52, and a parking rod 58 coupled to the detent lever 54 and provided to be movable with the rotation of the detent lever 54 in the longitudinal direction of the detent lever 54.

Here, the detent lever 54 is elastically supported by a detent spring 56 formed in a plate-like shape.

The operable force of the manual lever 52 can be adjusted by controlling the length of the detent spring 56.

The parking mechanism 50 comprises a parking rod cam 60 provided on the parking rod 58, a parking rod spring 62 provided on the parking rod 58 and for elastically supporting the parking rod cam 60, a parking gear 64 engaged with the drive gear 40 between the first motor section 20 and the second motor section 30, a sprag 66 hinged to the transmission housing 10 and engaged with the parking gear 64 with longitudinal movement of the parking rod cam 60, and a sprag spring 68 elastically supporting the sprag 66.

The parking gear 64 may be formed integrally and/or monolithically on one surface of the drive gear 40 facing the first motor section 20.

Figure 4:
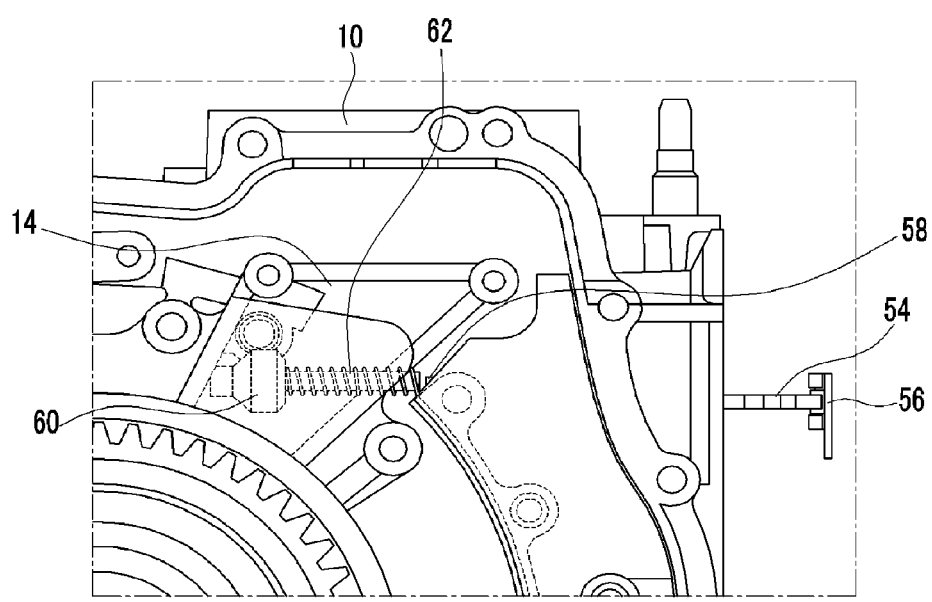
FIG. 4 is a partial front projection view showing the application of the parking mechanism of FIG. 1 in a hybrid vehicle according to the present invention.

Moreover, as shown in FIG. 4, when the parking rod 58 reciprocates by the rotation of the detent lever 54, it is guided by a brake housing 14 formed between the first motor section 20 and the second motor unit 30 within the transmission housing 10.

That is, the parking mechanism 50 can simplify the components as the parking gear 64 is formed integrally with the drive gear 40 and the parking rod 58 can be guided by the brake housing 14 without any guide bracket for guiding the reciprocal movement of the parking rod 58.

Therefore, the parking system for a hybrid vehicle thus configured according to various embodiments of the present invention can be reduced in overall size by improving the layout of the parking mechanism 50 within the transmission with two motors and forming the parking gear 64 integrally with the drive gear 40.

Moreover, a conventional guide bracket can be omitted because the parking rod 58 is guided through the brake housing 14 mounted within the transmission housing 10 when moved, thereby simplifying the components and reducing weight and production costs.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A parking system for a hybrid vehicle, the parking system comprising:
   a transmission housing;
   a first motor section provided in the transmission housing, and mounted on an input shaft;
   a second motor section provided at a rear of the first motor section, and mounted on the input shaft; and
   a parking mechanism provided between the first motor section and the second motor section for selectively restraining a drive gear spline-coupled to the second motor section.

2. The parking system of claim 1, wherein the parking mechanism comprises:
   a manual lever;
   a detent lever coupled to the manual lever and selectively rotating with the manual lever;
   a parking rod coupled to the detent lever and configured to move with the rotation of the detent lever in a longitudinal direction of the parking rod;
   a parking rod cam provided on the parking rod;
   a parking rod spring provided on the parking rod and elastically supporting the parking rod;
   a parking gear integrally formed with the drive gear between the first motor section and the second motor section;
   a sprag hinged to the transmission housing and engaged with the parking gear with a longitudinal movement of the parking rod cam; and
   a sprag spring elastically supporting the sprag.

3. The parking system of claim 2, wherein the parking gear is integrally formed on one surface of the drive gear facing the first motor section.

4. The parking system of claim 2, wherein the parking rod is guided by a brake housing formed between the first and second motor sections within the transmission housing when moved by the rotation of the detent lever.

* * * * *